United States Patent
Yang et al.

(10) Patent No.: US 10,325,739 B2
(45) Date of Patent: Jun. 18, 2019

(54) SURGE PROTECTION DEVICE

(71) Applicant: Littelfuse, Inc., Chicago, IL (US)

(72) Inventors: Wen Yang, Dongguan (CN); Hailang Tang, Dongguan (CN); Huawei Yin, Dongguan (CN); Stephen J. Whitney, Lake Zurich, IL (US); G. Todd Dietsch, Park Ridge, IL (US)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 15/866,804

(22) Filed: Jan. 10, 2018

(65) Prior Publication Data

US 2018/0130624 A1   May 10, 2018

Related U.S. Application Data

(62) Division of application No. 14/394,143, filed as application No. PCT/CN2012/083602 on Oct. 26, 2012, now Pat. No. 10,062,530.

(51) Int. Cl.
*H01H 37/60* (2006.01)
*H02H 9/04* (2006.01)
(Continued)

(52) U.S. Cl.
CPC .............. *H01H 37/60* (2013.01); *H01C 7/12* (2013.01); *H02H 9/041* (2013.01); *H01H 2085/0486* (2013.01); *H01H 2223/044* (2013.01)

(58) Field of Classification Search
CPC ............. H01H 37/60; H01H 2223/044; H01H 2085/0486; H01H 2037/762;
(Continued)

(56) References Cited

U.S. PATENT DOCUMENTS

| 3,863,111 A | 1/1975 | Martzloff |
| 4,975,674 A | 12/1990 | Sumiyoshi et al. |

(Continued)

FOREIGN PATENT DOCUMENTS

| CN | 2559122 Y | 7/2003 |
| CN | 1684331 A | 10/2005 |

(Continued)

OTHER PUBLICATIONS

Yi Yu; Zhihong Wang, "Lightning Protection Power Distributor with Double Tripping Function", May 30, 2012, Suzhou Ind Part Kejia Automation Co Ltd, Entire Document (Translation of CN 202260382). (Year: 2012).*

(Continued)

*Primary Examiner* — Anatoly Vortman
*Assistant Examiner* — Stephen S Sul (57) ABSTRACT

A circuit protection device including a housing defining a chamber and a metal oxide varistor (MOV) stack disposed within the chamber. A first spring is electrically attached at a first end to a first input terminal of the MOV stack by a solder connection and at a second end to a first input line. The first spring is biased away from the first input terminal. A second spring is electrically attached to a second input terminal of the MOV stack by a solder connection and at a second end to a second input line. The second conductive spring is biased away from the second input terminal. When an overvoltage condition occurs, heat generated by the MOV stack melts at least one of the first or second solder connections to allow the corresponding springs to be displaced away from the respective MOV stack input terminals.

15 Claims, 6 Drawing Sheets

(51) Int. Cl.
*H01C 7/12* (2006.01)
*H01H 85/048* (2006.01)

(58) Field of Classification Search
CPC ...... H01H 2037/763; H01H 1/28; H01C 7/12; H02H 9/041
USPC .................. 337/52, 195, 219, 342, 388, 407
See application file for complete search history.

(56) References Cited

U.S. PATENT DOCUMENTS

| | | | |
|---|---|---|---|
| 5,905,622 A | 5/1999 | Finlay, Sr. et al. | |
| 5,933,310 A * | 8/1999 | Eggendorfer | H02H 9/042 337/76 |
| 6,430,019 B1 | 8/2002 | Martenson et al. | |
| 6,535,369 B1 * | 3/2003 | Redding | H01C 7/126 361/111 |
| 6,683,770 B1 * | 1/2004 | Marsh | H02H 9/042 361/111 |
| 6,778,375 B1 * | 8/2004 | Hoopes | H02H 9/042 361/120 |
| 7,477,503 B2 | 1/2009 | Aszmus | |
| 7,483,252 B2 | 1/2009 | de Palma et al. | |
| 7,933,108 B2 | 4/2011 | Tallam | |
| 8,031,456 B2 | 10/2011 | Wang | |
| 8,378,778 B2 | 2/2013 | Duval et al. | |
| 9,147,510 B2 | 9/2015 | Depping et al. | |
| 9,172,236 B2 | 10/2015 | Hirschmann et al. | |
| 9,570,260 B2 | 2/2017 | Yang et al. | |
| 2001/0015687 A1 * | 8/2001 | McLoughlin | H01C 7/126 338/21 |
| 2002/0149899 A1 * | 10/2002 | Kladar | H01C 7/12 361/127 |
| 2006/0139832 A1 | 6/2006 | Yates et al. | |
| 2007/0128822 A1 | 6/2007 | McLoughlin et al. | |
| 2007/0217111 A1 * | 9/2007 | Tseng | H01C 7/126 361/118 |
| 2007/0285865 A1 | 12/2007 | McLoughlin et al. | |
| 2008/0304200 A1 * | 12/2008 | Hotchkiss | B29C 39/00 361/111 |
| 2009/0154034 A1 | 6/2009 | Tallam | |
| 2009/0323244 A1 | 12/2009 | Hoopes | |
| 2012/0050936 A1 | 3/2012 | Douglass et al. | |
| 2012/0068806 A1 * | 3/2012 | Guarniere | H01C 7/10 337/1 |
| 2013/0322017 A1 | 12/2013 | Muller et al. | |
| 2014/0092514 A1 | 4/2014 | Chen | |
| 2014/0232512 A1 * | 8/2014 | Yang | H01H 37/761 337/401 |
| 2014/0292472 A1 * | 10/2014 | Qin | H01H 85/306 337/5 |

FOREIGN PATENT DOCUMENTS

| | | | |
|---|---|---|---|
| CN | 201294330 Y | 8/2009 | |
| CN | 202142847 U | 2/2012 | |
| CN | 202260382 * | 5/2012 | ............... H02H 3/04 |
| CN | 202260382 U | 5/2012 | |
| CN | 102736027 A | 10/2012 | |
| CN | 102739027 A | 10/2012 | |
| CN | 103703534 A | 4/2014 | |
| CN | 104269835 A | 1/2015 | |
| EP | 2434501 A2 | 3/2012 | |
| JP | 2007202392 A | 8/2007 | |
| JP | 3149085 U | 3/2009 | |
| JP | 3155941 U | 12/2009 | |
| KR | 20100073222 A | 7/2010 | |
| TW | 200820298 A | 5/2008 | |
| TW | 201230115 A | 7/2012 | |

OTHER PUBLICATIONS

International Search Report and Written Opinion for the International Application No. PCT/CN2015/075957, dated Jun. 29, 2015, 11 pages.
International Search Report and Written Opinion for the International Application No. PCT/CN2012/083602, dated Jul. 25, 2013.

* cited by examiner

SURGE PROTECTION DEVICE

CROSS-REFERENCE TO RELATED APPLICATIONS

This Application is a divisional of U.S. patent application Ser. No. 14/394,143, filed Oct. 13, 2014, which claims priority to International Patent Application No. PCT/CN2012/083602, filed Oct. 12, 2016, entitled Surge Protection Device, hereby incorporated by reference in its entirety.

BACKGROUND OF THE INVENTION

Field of the Invention

Embodiments of the invention relate to the field of circuit protection devices. More particularly, the present invention relates to a surge protection device including a metal oxide varistor stack with an integral thermal disconnect configured to provide an expedient thermal response in the event of overheating due to an abnormal overvoltage condition.

Discussion of Related Art

Overvoltage protection devices are used to protect electronic circuits and components from damage due to overvoltage fault conditions. These overvoltage protection devices may include metal oxide varistors (MOVs) that are connected between the circuits to be protected and a ground line. MOVs have a unique current-voltage characteristic that allows them to be used to protect such circuits against catastrophic voltage surges. These devices may utilize a thermal link which melts during an overvoltage condition to form an open circuit. In particular, when a voltage that is larger than the nominal or threshold voltage of an MOV is applied to the device, current flows through the MOV which generates heat that causes the thermal link to melt. Once the link melts, an open circuit is created which prevents the overvoltage condition from damaging the circuit to be protected. However, these existing circuit protection devices do not provide an efficient heat transfer from the MOV to the thermal link, thereby delaying response times. In addition, MOV devices have relatively high inductance characteristics which degrade performance in the presence of fast overvoltage transients. Moreover, existing circuit protection devices are complicated to assemble and connect in certain applications such as, for example, in LED protection which increases manufacturing costs. Accordingly, it will be appreciated that improvements are desirable in present day circuit protection devices employing metal oxide varistors.

SUMMARY OF THE INVENTION

Exemplary embodiments of the present invention are directed to a circuit protection device. In an exemplary embodiment, the circuit protection device includes a housing defining a chamber, a metal oxide varistor stack, and first and second conductive springs. The metal oxide varistor stack is disposed within the chamber of the housing. The first conductive spring is electrically attached at a first end to a first input terminal of the metal oxide varistor stack by a first solder connection and at a second end to a first input line. The first conductive spring is biased away from the first input terminal of the metal oxide varistor stack. The second conductive spring is electrically attached at a first end to a second input terminal of the metal oxide varistor stack by a second solder connection and at a second end to a second input line. The second conductive spring is biased away from the second input terminal of the metal oxide varistor stack, wherein when an overvoltage condition occurs, heat generated by the metal oxide varistor stack melts at least one of the first or second solder connections to allow the corresponding first or second conductive springs to be displaced away from the first or second input terminals of the metal oxide varistor circuit to define an open circuit.

BRIEF DESCRIPTION OF THE DRAWINGS

FIG. 6b is a rear perspective view of the first alternative embodiment of the circuit protection device shown in FIG. 6a.

FIG. 7b is a rear perspective view of the second alternative embodiment of the circuit protection device shown in FIG. 7a.

DESCRIPTION OF EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Figure 1A:
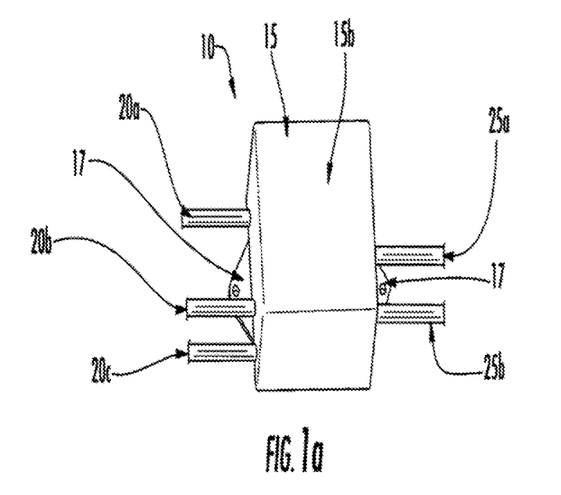
FIG. 1a is a perspective view of a circuit protection device in accordance with an embodiment of the present disclosure.
Figure 1B:
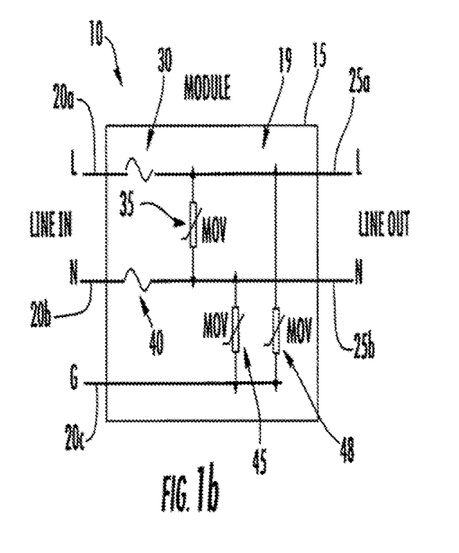
FIG. 1b is a schematic of a circuit protection device in accordance with an embodiment of the present disclosure.

FIGS. 1A and 1B respectively illustrate a perspective view and a schematic diagram of a circuit protection device 10 in accordance with the present disclosure. The protection device 10 may include a housing 15, input lines 20a, 20b, and 20c, and output lines 25a and 25b. The input line 20a may be a line wire, the input line 20b may be neutral, and the input line 20c may be ground. Likewise, the output line 25b may be a corresponding line wire and the output line 25b may be a corresponding neutral. The input and output lines 20a-c, 25a, and 25b are used to connect the protection device 10 between a source of power (not shown) and a device or circuit to be protected (not shown) in accordance with an embodiment of the present disclosure.

The housing 15 of the protection device 10 may be defined by an internal bottom portion 15a (see FIG. 3) and a cover 15b, where the bottom portion 15a may include a plurality of flanges 17 extending therefrom which may be used to fasten device 10 in an operative position (the bottom portion 15a is referred to as "internal" because it is covered by, and matingly fits within, the cover 15b, such as by snap fit or friction fit). The internal bottom portion 15a and the cover 15b define an enclosed chamber 19 within which a stack of metal oxide varistors (MOV's) 35, 45, and 48 is disposed in electrical connection with input lines 20a, 20b, and 20c and output lines 25a and 25b as further described below. Alternatively, it is contemplated that the bottom portion 15a of the housing 15 can be an integral component or portion of a printed circuit board (PCB) of a device to be protected, and that the MOV's 35, 45, and 48, as well as the other internal components of the protection device 10 (further described below) can be mounted directly to such component or portion of the PCB with the cover portion 15b of the housing 15 fitting thereupon.

Figure 5A:
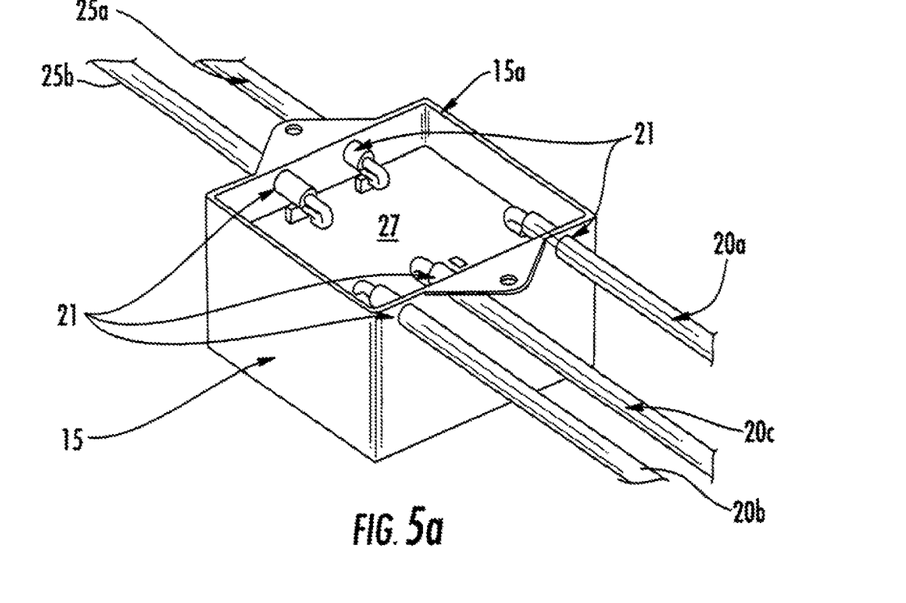
FIG. 5a is a bottom perspective view of the circuit protection device shown in FIG. 1a with the cavity of the bottom portion of the housing unfilled.
Figure 5B:
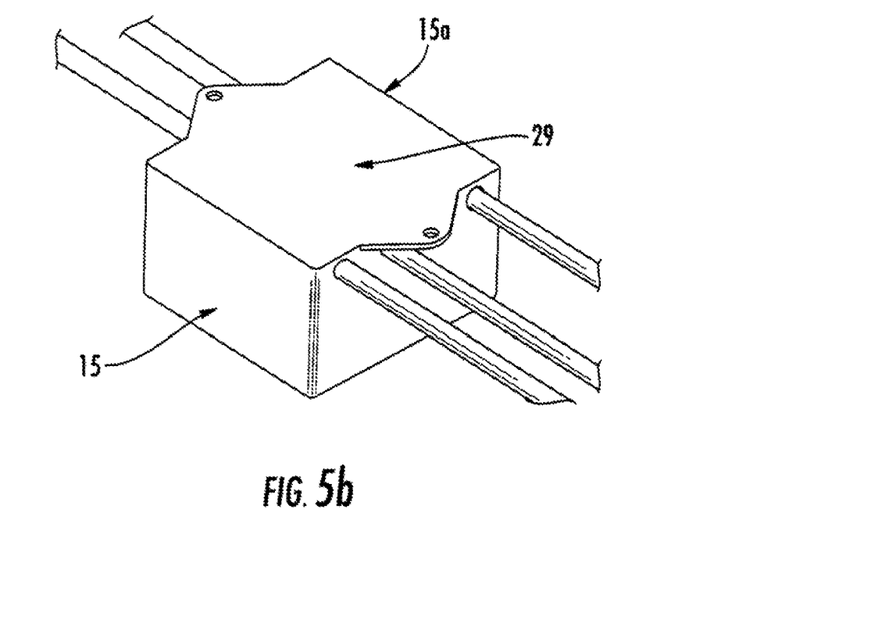
FIG. 5b is a bottom perspective view of the circuit protection device shown in FIG. 1a with the cavity of the bottom portion of the housing filled with a potting material.

Referring briefly to FIG. 5a, a bottom perspective view of the housing 15 is illustrated where a plurality of apertures 21 may be formed in the sidewalls of the bottom portion 15a of the housing 15 for allowing the input lines 20a-c and the output lines 25a and 25b to pass therethrough. The input and output lines 20a-c, 25a, and 25b may thus extend into a cavity 27 that may be defined by the floor and sidewalls of the lower portion 15a. The input and output lines 20a-c, 25a, and 25b may extend upwardly from the cavity 27, through the floor of the bottom portion 15a, and into the chamber 19 (described above) for connection with the internal components of the protection device 10 as described below. Referring to FIG. 5b, the cavity of the bottom portion 15a may be filled with a potting epoxy 29 or other solid or gelatinous compound, such as a thermo-setting plastic or silicone rubber gel, using a conventional potting process. The input and output lines 20a-c, 25a, and 25b may thereby be encased in the potting material 29, which may provide protection against shock and vibration and prevent the ingress of moisture and corrosive agents which might otherwise damage or deteriorate electrical connections between the lines and the protection device 10. It will be appreciated by those of ordinary skill in the art that the housing 15 may be embodied by a variety of alternative structures and configurations that facilitate the electrical connections described herein and that provide the MOV stack of the present disclosure (described below) with adequate protection from an external environment.

Referring to FIG. 1B, a first thermal disconnect 30, such as may be formed of a low temperature solder fillet as further described below, is disposed on the input line 20a and is connected to one end of the first MOV 35 via the output line 25a. A second thermal disconnect 40, such as may also be formed of a solder fillet, is disposed on the input line 20b and is connected to a second end of the MOV 35 and to a first end of the MOV 45 via the output line 25b. A first end of the MOV 48 is connected to the thermal disconnect 30 via the output line 25a. A second end of the MOV 45 and a second end of the MOV 48 are connected to the ground line 20c. Thus, the MOV 48 is connected at a first end to a first end of the MOV 35 and at a second end to ground and to the second end of the MOV 45.

During normal operation of the circuit protection device 10 (i.e. where an overvoltage condition does not exist), the stack of MOV's 35, 45, and 48 does not produce a sufficient amount of heat to melt one or both of the thermal disconnects 30 and 40. However, since each of the MOV's 35, 45, and 48 is a voltage sensitive device that heats-up when voltage applied across the MOV exceeds the MOV's rated voltage, the occurrence of an overvoltage condition causes the stack of MOV's 35, 45, and 48 to heat up. The heat radiated by the stack of MOV's 35, 45, and 48 upon the occurrence of an overvoltage condition is sufficient to cause one or both of the thermal disconnects 30 and 40 to melt, thereby creating an open circuit which prevents the overvoltage condition from damaging a device or circuit that is connected to the output lines 25a and 25b.

By the way of background, each of the MOVs 35, 45, and 48 may be primarily comprised of zinc oxide granules that are sintered together to form a circular or square disc wherein the zinc oxide granule, as a solid, is a highly conductive material, while the intergranular boundary formed of other oxides is highly resistive. Only at those points where zinc oxide granules meet does sintering produce a 'microvaristor' which is comparable to symmetrical zener diodes. The electrical behavior of a metal oxide varistor results from the number of microvaristors connected in series or in parallel. The sintered body of an MOV also explains its high electrical load capacity which permits high absorption of energy and thus, exceptionally high surge current handling capability.

Figure 2A:
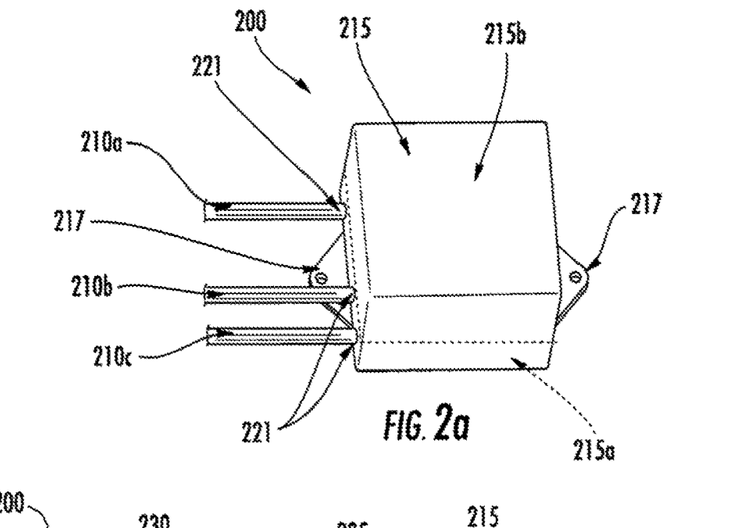
FIG. 2a is a perspective view of a circuit protection device in accordance with an embodiment of the present disclosure.
Figure 2B:
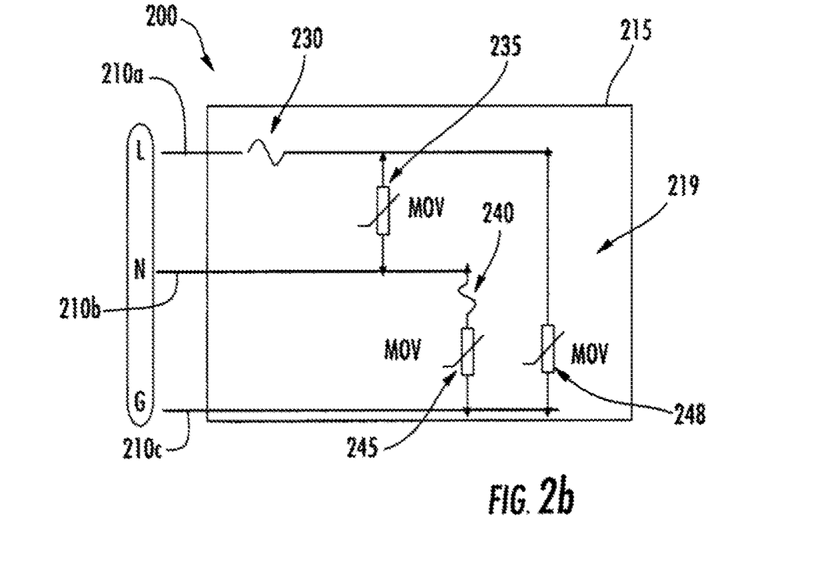
FIG. 2b is a schematic of a circuit protection device in accordance with an embodiment of the present disclosure.

FIGS. 2A and 2B respectively illustrate a perspective view and a schematic diagram of an alternative embodiment of a circuit protection device 200 in accordance with the present disclosure. The protection device 200 may include a housing 215 and input connection lines 210a, 210b, and 210c. The input line 210a may be a line wire, the input line 210b may be neutral, and the input line 210c may be ground, for example. The connection lines 210a-c are used to connect the protection device 200 between a source of power (not shown) and a device or circuit to be protected (not shown) in accordance with an embodiment of the present disclosure.

Similar to the housing 15 of the circuit protection device 10 described above and shown in FIGS. 1a and 1b, the housing 215 of the device 200 may be defined by an internal bottom portion 215a and a cover 215b, where the bottom portion 215a may include a plurality of flanges 217 extending therefrom that may be used to fasten the device 200 in an operative position (the bottom portion 215a is referred to as "internal" because it is covered by, and matingly fits within, the cover 215b, such as by snap fit or friction fit). The bottom portion 215a and the cover 215b define an enclosed chamber 219 within which a stack of metal oxide varistors (MOV's) 235, 245, and 248 is disposed in electrical connection with input lines 210a-c as further described below.

The bottom portion 215a of the housing 215 may be provided with apertures 221 and a cavity (not within view) similar to those of the housing 15 shown in FIG. 5a for receiving the input lines 210a-c. The cavity of the bottom portion 215a may be filled with a potting material in a similar manner to the cavity 27 of the bottom portion 15a of the housing 15 described above and as shown in FIG. 5b, wherein such potting material may include epoxy or other solid or gelatinous compounds, such as a thermo-setting plastic or silicone rubber gel. The input lines 210a-c may thereby be protected against shock, vibration, and moisture.

Referring to FIG. 2B, a first thermal disconnect 230, such as may be formed of a low temperature solder fillet as further described below, may be disposed on the connection line 210a and may be connected thereby to first ends of MOV's 235 and 248. A second thermal disconnect 240, such as may also be formed of a low temperature solder fillet, may be disposed on the connection line 210b and may be connected thereby to a second end of the MOV 235 and to a first end of the MOV 245. A second end of the MOV 245 and a second end of the MOV 248 may be connected to the ground connection line 210c. Thus, the MOV 248 is connected at a first end to a first end of the MOV 235 and at a second end to ground.

During normal operation of the device 200 (i.e. where an overvoltage condition does not exist), the stack of MOV's 235, 245, and 248 does not produce a sufficient amount of heat to melt one or both of the thermal disconnects 230 and 240. However, since each of the MOV's 235, 245, and 248 is a voltage sensitive device that heats-up when voltage applied across the MOV exceeds the MOV's rated voltage, the occurrence of an overvoltage condition causes the stack of MOV's 235, 245, and 248 to heat up. The heat radiated by the stack of MOV's 235, 245, and 248 upon the occurrence of an overvoltage condition causes one or both of the thermal disconnects 230 and 240 to melt, thereby creating an open circuit which prevents the overvoltage condition from damaging a device or circuit that is protected by the device 200.

Figure 3:
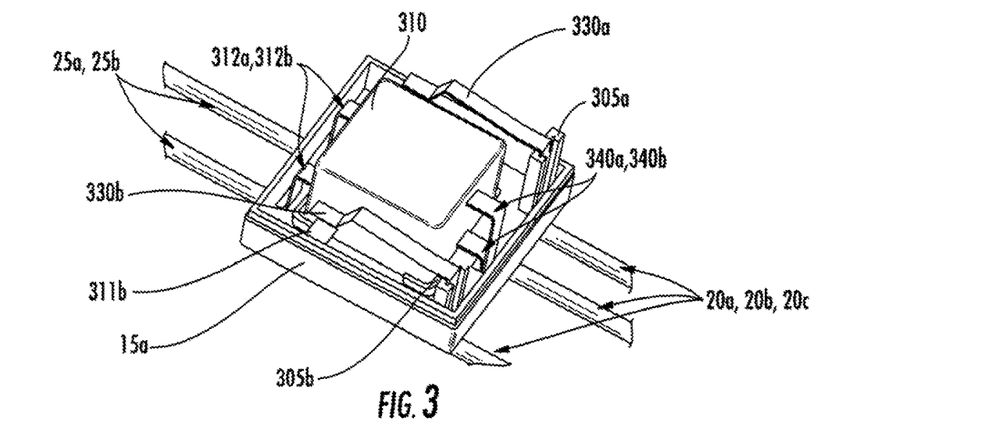
FIG. 3 is a cut-away perspective view of a circuit protection device shown in an open condition in accordance with an embodiment of the present disclosure.

FIG. 3 is a cut-away perspective view of the exemplary circuit protection device 10 shown in FIG. 1 with the cover 15b removed from the housing 15. An MOV stack 310 is disposed within a portion of the chamber 19 defined by bottom portion 15a. As described above, the MOV stack 310 may be comprised of a plurality of MOV's having associated surge capabilities and operating temperature ratings. For example, the MOV stack 310 may comprise three MOV's 35, 45, and 48 as described above with various pin configurations to accommodate connections to the input lines 20a-20c and the output lines 25a and 25b. The MOV stack 310 may be coated with epoxy and disposed within the chamber 19 of the bottom portion 15a.

The input lines 20a and 20b may be connected to conductive springs 330a and 330b that are mounted to the bottom portion 15a of the housing 15 in a cantilevered configuration. The non-cantilevered end of the first conductive spring 330a may be connected to the input line 20a and the non-cantilevered end of the second conductive spring 330b may be connected to the input line 20b. The conductive springs 330a and 330b may be connected to the input lines 20a and 20b via welding or other electrically-conductive connection means. The conductive springs 330a and 330b may extend upwardly from their points of attachment to the input lines 20a and 20b and may further extend at substantially right angles over respective protrusions 305a and 305b which extend upwardly from a top surface of the bottom portion 15a. The protrusions 305a and 305b serve to bias the cantilevered ends of each of the respective conductive springs 330a and 330b upwardly, away from a first MOV connection terminal 311a (not within view in FIG. 3 but shown in FIG. 4) and a second MOV connection terminal 311b. Conductive protrusions 340a and 340b, which may be integral with the MOV stack 310, may extend from the MOV stack 310 and may be connected to the input wire 20c to provide the MOV stack 310 with a connection to ground. The output lines 25a and 25b may be connected to the first and second output terminals 312a and 312b of the MOV stack 310.

As shown in FIG. 3, the conductive springs 330a and 330b of the protective device 10 are in an open position, wherein the cantilevered ends of the conductive springs 330a and 330b are not in contact with the MOV connection terminals 311a and 311b, such as may be the case after the occurrence of an overvoltage condition. Conversely, in a normal operating condition, each of the respective conductive springs 330a and 330b may be in a closed position, wherein the cantilevered ends of the conductive springs 330a and 330b are electrically connected to their respective MOV connection terminals by low temperature solder fillets which define the thermal disconnects 30 and 40 of the protection device 10 as described above.

Figure 4:
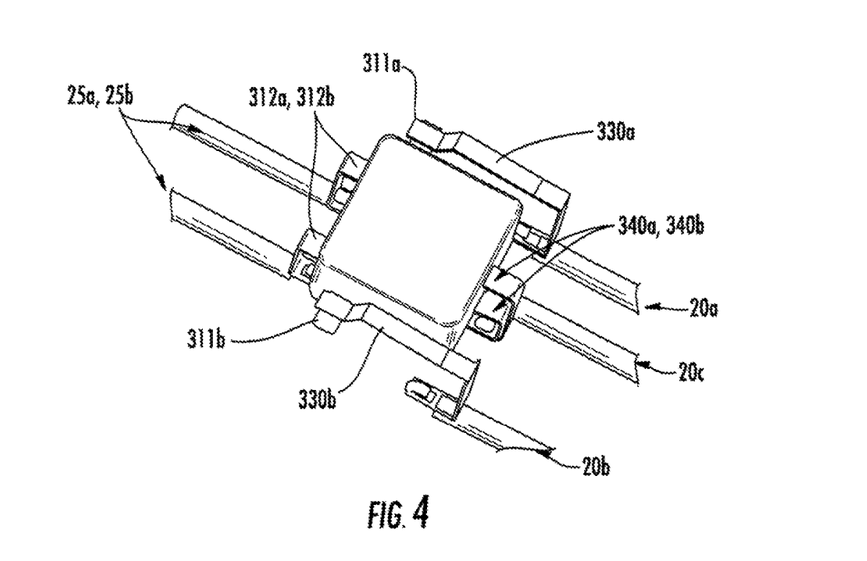
FIG. 4 is an exploded perspective view of a portion of the MOV stack and spring assembly shown in FIG. 3 in accordance with an embodiment of the present disclosure.

FIG. 4 illustrates an exploded perspective view of a portion of the MOV stack 310 and the spring assembly shown in FIG. 3. As described above with reference to FIG. 3, the MOV stack 310 may include first and second input terminals 311a and 311b. As described above, the input terminals 311a and 311b are electrically connected to the cantilevered ends of the first and second conductive springs 330a and 330b by low temperature solder fillets (i.e. thermal disconnects 30 and 40) when the circuit protection device 10 is in a normal operating condition. The input line 20a may be electrically connected to the non-cantilevered end of first spring 330a. The input line 20b may be electrically connected to the non-cantilevered end of second spring 330b. The input line 20c may be electrically connected to the protrusions 340a and 340b of the MOV stack 310. The output lines 25a and 25b may be electrically connected to the output terminals 312a and 312b of the MOV stack 310, respectively.

Although both of the conductive springs 330a and 330b are illustrated as having a particular shape and configuration, many alternative shapes and configurations are contemplated and may be implemented in place of those shown and described above without departing from the present disclosure. For example, an alternative embodiment of the circuit protection device 10 is contemplated in which the conductive springs 330a and 330b are disposed within the chamber 19 and form connections between input lines 20a-c and output lines 25a and 25b, respectively.

Figure 6A:
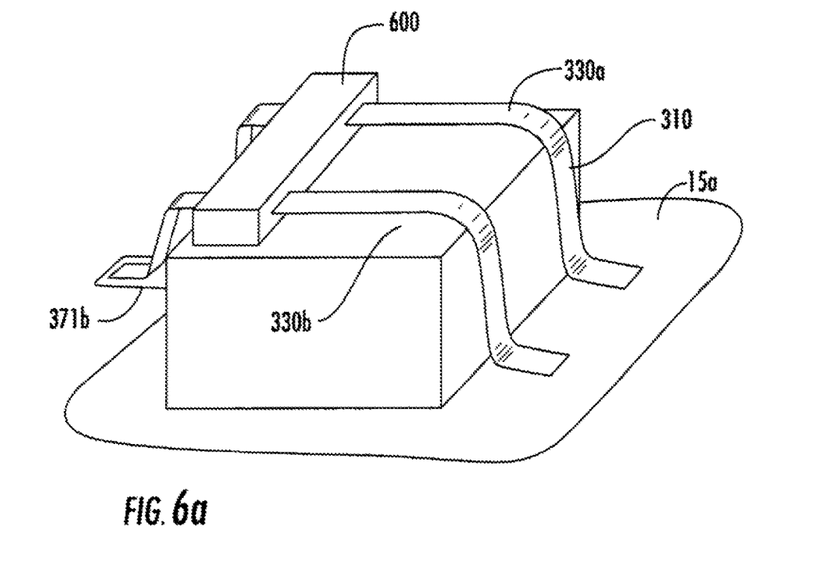
FIG. 6a is a side perspective view of a first alternative embodiment of the circuit protection device of the present disclosure.
Figure 6B:
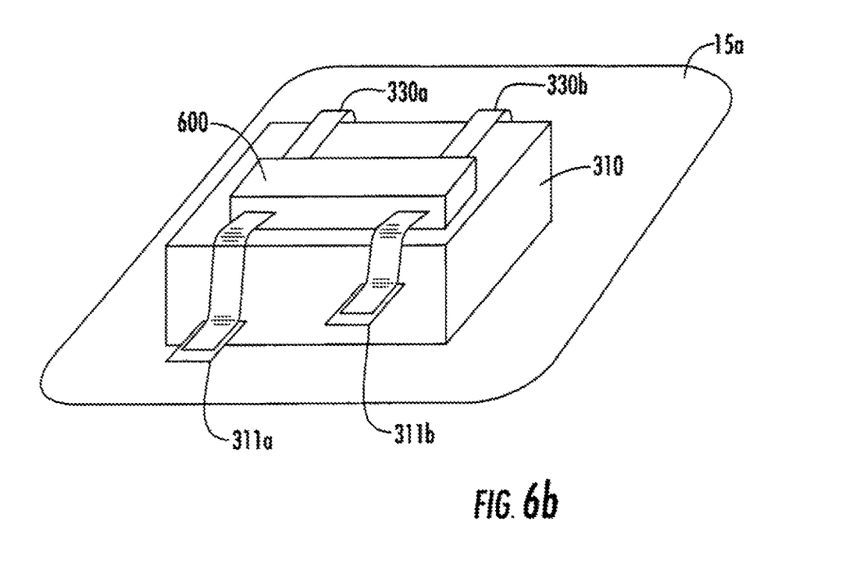

In another contemplated embodiment of the circuit protection device 10, shown in FIGS. 6a and 6b, the conductive springs 330a and 330b may be connected to each other by a rigid, electrically insulating member 600. The insulating member 600 substantially prevents relative movement of the conductive springs 330a and 330b. Thus, when the low temperature solder fillets (i.e. thermal disconnects 30 and 40 shown in FIG. 1b) that connect the cantilevered ends of the conductive springs 330a and 330b to the input terminals 311a and 311b melt, such as upon the occurrence of an overvoltage condition, the upwardly-biased cantilevered ends simultaneously move out of contact with the input terminals 311a and 311b, thereby simultaneously breaking the electrical connections between the conductive springs 330a and 330b and the input terminals 311a and 311b.

Figure 7A:
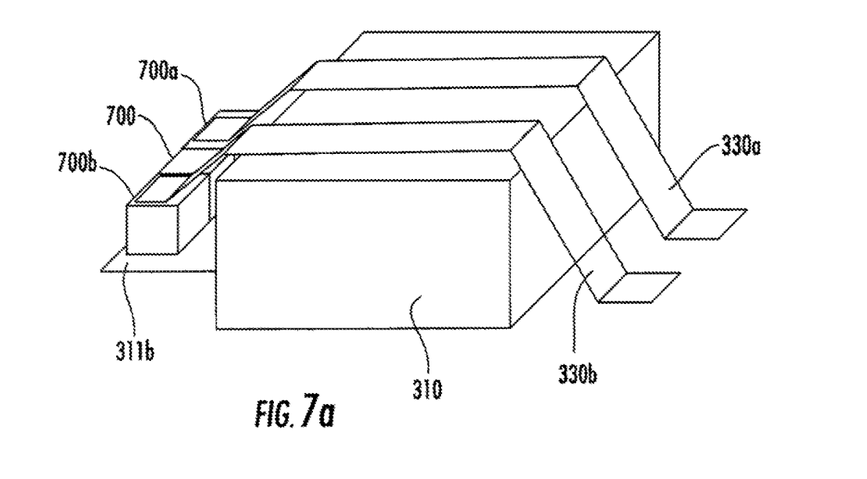
FIG. 7a is a side perspective view of a second alternative embodiment of the circuit protection device of the present disclosure.
Figure 7B:
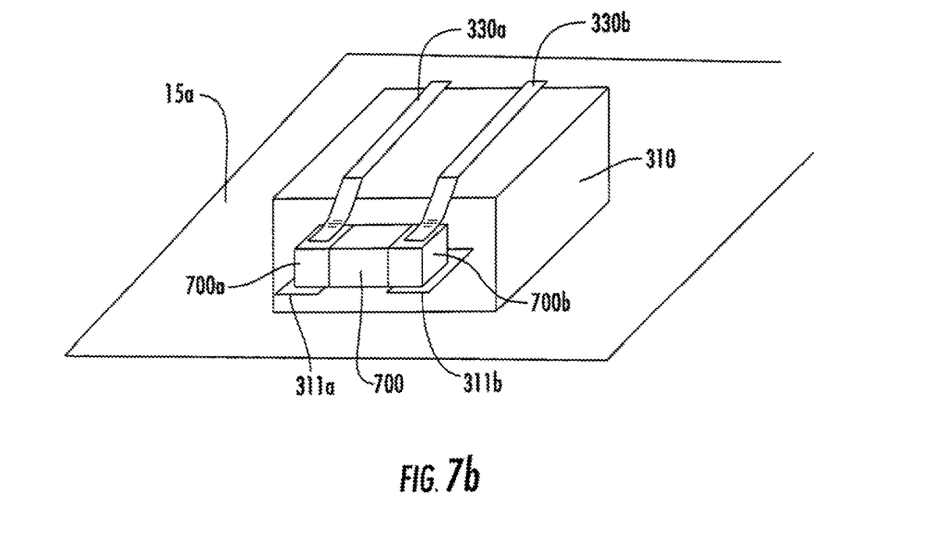

In yet another contemplated embodiment of the circuit protection device 10, shown in FIGS. 7*a* and 7*b*, a high thermal conductivity, electrically insulating member 700 having electrically conductive, metalized end portions 700*a* and 700*b* may be interposed between the cantilevered ends of the conductive springs 330*a* and 330*b* and the input terminals 311*a* and 311*b*. The insulating member 700 may be formed of any high thermal conductivity, electrically insulating material, including, but not limited to, aluminum nitride (AlN), beryllium oxide (BeO), silicon carbide (SiC), various metal-ceramic composites, or metal with one or more insulative surface layers.

The metalized end portion 700*a* of the insulating member 700 may be attached to the conductive spring 330*a* by a high temperature bond, such as a weld, and may be attached to the input terminal 311*a* by a low temperature bond (i.e. thermal disconnect 30 shown in FIG. 1*b*), such as a low temperature solder fillet. The term "high temperature bond" is defined herein to mean a bond having a relatively higher melting temperature than that of the low temperature bond. Similarly, the metalized end portion 700*b* of the insulating member 700 may be attached to the conductive spring 330*b* by a high temperature bond, such as a weld, and may be attached to the input terminal 311*b* by a low temperature bond (i.e. thermal disconnect 40 shown in FIG. 1*b*), such as a low temperature solder fillet. An electrical connection is thereby provided between each of the conductive springs 330*a* and 330*b* and the respective input terminals 311*a* and 311*b*. Upon the occurrence of an overvoltage condition, the thermal conductivity of the electrically insulating member 700 allows heat to be transferred between the low temperature bonds that connect the conductive springs 330*a* and 330*b* to the input terminals 311*a* and 311*b*, resulting in simultaneous melting of the bonds and subsequent movement of the insulating member 700 away from the input terminals 311*a* and 311*b*. The electrical connections between the conductive springs 330*a* and 330*b* and the respective input terminals 311*a* and 311*b* are thereby simultaneously broken.

In view of the forgoing, it will be appreciated that a circuit protection device in accordance with the present disclosure provides an expedient thermal response in the event of overheating due to an abnormal overvoltage condition, and thereby effectively protects devices or circuits that are connected to the circuit protection device from damage that could otherwise result from such overvoltage conditions. In addition, it will be appreciated that the circuit protection device in accordance with the present disclosure may be implemented quickly, easily, and at relatively little cost relative to traditional circuit protection devices that employ MOV's.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A circuit protection device comprising:
   a housing defining a chamber;
   a metal oxide varistor stack including at least three metal oxide varistors disposed within a single epoxy coating, the epoxy coated metal oxide varistors disposed within the chamber;
   a first conductive spring physically connected at a first end to a first input terminal of the metal oxide varistor stack by a first thermal disconnect and at a second end to a first input line, the first input terminal extending through the single epoxy coating and disposed so that the first conductive spring is in direct electrical contact with two of the at least three metal oxide varistors, wherein the first conductive spring is biased away from the first input terminal of the metal oxide varistor stack;
   a second conductive spring physically connected at a first end to a second input terminal of the metal oxide varistor stack by a second thermal disconnect and at a second end to a second input line, the second input terminal extending through the single epoxy coating and disposed so that the second conductive spring is in direct electrical contact with two of the at least three metal oxide varistors, wherein the second conductive spring is biased away from the second input terminal of the metal oxide varistor stack; and
   a rigid, electrically insulating member connecting the first conductive spring to the second conductive spring and limiting relative movement therebetween wherein when an overvoltage condition occurs, heat generated by the metal oxide varistor stack melts at least one of the first or second thermal disconnects to allow the corresponding first or second conductive springs to be displaced away from the first or second input terminals of the metal oxide varistor stack to define an open circuit.

2. The circuit protection device of claim 1, wherein the metal oxide varistor stack comprises a plurality of metal oxide varistors in an electrically parallel connection.

3. The circuit protection device of claim 1, wherein the metal oxide varistor stack comprises a plurality of metal oxide varistors in an electrically serial connection.

4. The circuit protection device of claim 1, wherein at least one of the first and second thermal disconnects comprises a low temperature solder fillet.

5. The circuit protection device of claim 1, wherein the housing comprises a bottom portion and a cover.

6. The circuit protection device of claim 5, wherein the bottom portion is covered by, and matingly fits within, the cover.

7. The circuit protection device of claim 5, wherein the bottom portion of the housing defines a cavity on a lower side thereof for receiving the input lines.

8. The circuit protection device of claim 7, wherein the input lines extend from the cavity, through a floor of the bottom portion of the housing, and into the chamber.

9. The circuit protection device of claim 8, wherein the cavity in the bottom portion of the housing is filled with potting material.

10. The circuit protection device of claim 9, wherein the potting material comprises an epoxy.

11. The circuit protection device of claim 9, wherein the potting material comprises a thermo-setting plastic.

12. The circuit protection device of claim 9, wherein the potting material comprises a silicone rubber gel.

13. The circuit protection device of claim 1, further comprising a first output line electrically connected to a first output terminal of the metal oxide varistor stack and a second output line electrically connected to a second output terminal of the metal oxide varistor stack.

14. The circuit protection device of claim 1, further comprising at least one conductive protrusion extending from the metal oxide varistor stack and electrically connected to ground.

15. The circuit protection device of claim 1, wherein the metal oxide varistor stack is coated with epoxy.

* * * * *